May 8, 1962 J. M. FENNER 3,032,963
CORD AND ARTICLE CONTAINING THE SAME
Filed Aug. 11, 1959

INVENTOR
JAMES M. FENNER
By Donald G. Dalton
Attorney

United States Patent Office 3,032,963
Patented May 8, 1962

3,032,963
CORD AND ARTICLE CONTAINING THE SAME
James M. Fenner, Bainbridge Township, Geauga County, Ohio, assignor to United States Steel Corporation, a corporation of New Jersey
Filed Aug. 11, 1959, Ser. No. 833,005
4 Claims. (Cl. 57—145)

This invention relates to a cord and to an article containing the same and more particularly to a steel cord for use in breaker ply strands of a single wire ply cord tire. Such tires such as that shown in Boussu Patent No. 2,884,040 dated April 28, 1959, includes so-called breaker or head plies in the tread of the tire. The purpose of these breaker plies is to provide the required tread stiffness for even tread wear and impact resistance. The cord or stranded structure used in the breaker ply need not have as high fatigue strength and flexibility as required in the carcass ply, but must be sufficiently stiff and strong to resist the impact on the tread. The cost of the cord used for this purpose at present is relatively high.

It is therefore an object of my invention to provide a cord which is inexpensive to manufacture and yet has the required fatigue strength, flexibility and impact resistance as is particularly required in a breaker ply.

Another object is to provide such a cord which when embedded in a rubber article will have good bond and minimum weight.

These and other objects will be more apparent after referring to the following specification and attached drawings, in which.

Figure 1:
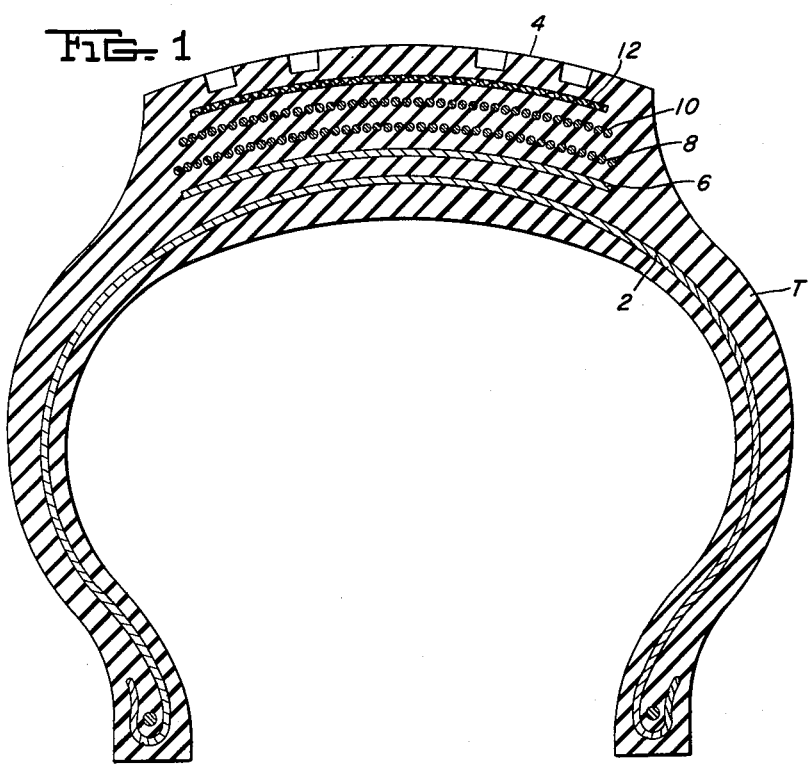
FIGURE 1 is a cross sectional view through a tire casing.
Figure 2:
FIGURE 2 is a longitudinal view of the cord of my invention to an enlarged scale.
Figure 3:
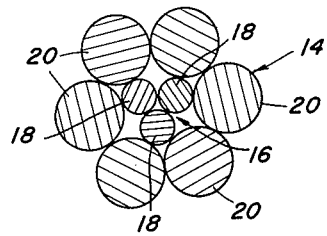
FIGURE 3 is an enlarged cross sectional view of the cord of FIGURE 2.

Referring more particularly to the drawings, reference numeral 2 discloses a single carcass ply embedded in the tire casing T. The tire casing T also includes a tread portion 4, crown or head plies 6, 8 and 10 and a breaker ply 12 which are embedded in and bonded to the rubber of the tire casing. The parts so far described are conventional and are shown in the above mentioned Boussu patent. The plies 6, 8, 10 and 12 include a plurality of cords 14 constructed in accordance with my invention. The cord or stranded structure 14 includes a center core 16 made up of three wires 18 stranded together. Six wires 20 are stranded around the core 16. The diameter of each of the wires 18 is half the diameter of the wires 20 and the lay of the wires 16 forming the core is opposite in direction to the lay of the wires 20 around the core. In one particular core the diameter of each of the wires 18 is .0075 in. and the diameter of each of the wires 20 is .015 in. In smaller tires the diameter of the wires 18 may be .006 in. and the diameter of the wires 20 .012 in. The lay of the wires in the core may be varied between two and five twists per inch and the lay of the six wires around the core may vary between 1.3 and 2.7 twists per inch. The optimum lay of the core wires is three twists per inch and that of the six wires around the core two twists per inch. This novel structure permits the use of larger diameter wires and requires fewer breaker plies to give the tire carcass the required degree of stiffness. Also, as compared to earlier cords, as much as 25% less steel is required. The strength and stiffness of the cord may be varied by varying the tensile strength and size of the individual wires.

While one embodiment of my invention has been shown and described it will be apparent that other adaptations and modifications may be made without departing from the scope of the following claims.

I claim:

1. A stranded wire structure comprising a center core including three metal wires stranded together, and six individual metal wires stranded around said center core, the diameter of each of said six wires being approximately twice the diameter of each of the core wires.

2. A stranded wire structure comprising a center core including three metal wires stranded together, and six individual metal wires stranded around said center core, the diameter of each of said six wires being approximately twice the diameter of each of the core wires, the lay of the wires around the core being opposite hand to the lay of the wires in the core.

3. An article comprising a metallic cord embedded in rubber with the rubber extending into the interstices thereof, said cord comprising a center core including three wires stranded together, and six individual wires stranded around said center core, the diameter of each of said six wires being approximately twice the diameter of each of the core wires.

4. An article comprising a metallic cord embedded in rubber with the rubber extending into the interstices thereof, said cord comprising a center core including three wires stranded together, and six individual wires stranded around said center core, the diameter of each of said six wires being approximately twice the diameter of each of the core wires, the lay of the wires around the core being opposite hand to the lay of the wires in the core.

References Cited in the file of this patent

UNITED STATES PATENTS

| | | |
|---|---|---|
| 1,759,410 | Marston | May 20, 1930 |
| 2,143,694 | Hauvette | Jan. 10, 1939 |
| 2,277,145 | Pierce | Mar. 24, 1942 |
| 2,563,113 | Hindin et al. | Aug. 7, 1951 |
| 2,605,201 | Howe | July 29, 1952 |
| 2,792,868 | Benson | May 21, 1957 |

FOREIGN PATENTS

| | | |
|---|---|---|
| 344,194 | Great Britain | Mar. 5, 1931 |